(12) United States Patent
Yesilyaprak et al.

(10) Patent No.: US 11,994,742 B2
(45) Date of Patent: May 28, 2024

(54) SCANNER OPTO-MECHATRONIC SYSTEM WITH FIXED DETECTOR AND MOVING MIRROR

(71) Applicant: ATATÜRK ÜNIVERSITESI BILIMSEL ARASTIRMA PROJELERI BIRIMI, Erzurum (AR)

(72) Inventors: Cahit Yesilyaprak, Erzurum (AR); Murat Koçak, Erzurum (AR)

(*) Notice: Subject to any disclaimer, the term of this patent is extended or adjusted under 35 U.S.C. 154(b) by 0 days.

(21) Appl. No.: 17/906,224

(22) PCT Filed: Dec. 14, 2021

(86) PCT No.: PCT/TR2021/051401
§ 371 (c)(1),
(2) Date: Sep. 13, 2022

(87) PCT Pub. No.: WO2022/139752
PCT Pub. Date: Jun. 30, 2022

(65) Prior Publication Data
US 2023/0136096 A1    May 4, 2023

(30) Foreign Application Priority Data
Dec. 23, 2020 (TR) ................... 2020/21413

(51) Int. Cl.
*G02B 7/182* (2021.01)
*G01J 1/04* (2006.01)
*G02B 26/08* (2006.01)
*G02B 26/10* (2006.01)
*H02K 11/21* (2016.01)

(52) U.S. Cl.
CPC .......... *G02B 7/1821* (2013.01); *G01J 1/0403* (2013.01); *G02B 26/0816* (2013.01); *G02B 26/101* (2013.01); *H02K 11/21* (2016.01)

(58) Field of Classification Search
CPC .............. G02B 7/1821; G02B 26/0816; G02B 26/101; G02B 23/04; G01J 1/0403; H02K 11/21
See application file for complete search history.

(56) References Cited

U.S. PATENT DOCUMENTS

| 5,333,076 A | 7/1994 | Wight |
| 5,485,306 A * | 1/1996 | Kiunke ................. G02B 23/08 359/399 |
| 6,927,905 B1 | 8/2005 | Kashitani et al. |

(Continued)

FOREIGN PATENT DOCUMENTS

| FR | 2695731 A1 * | 3/1994 | ............. G01S 3/789 |
| WO | 2012013277 A1 | 2/2012 | |

OTHER PUBLICATIONS

International Search Report and Written Opinion of the International Searching Authorityfor corresponding PCT/TR2021/051401, dated May 17, 2022.

*Primary Examiner* — Jennifer D Bennett
(74) *Attorney, Agent, or Firm* — Egbert, McDaniel & Swartz, PLLC

(57) ABSTRACT

Disclosed is a scanner opto-mechatronics system which is used in light/image-measurement in three-dimensional environments, reduces the light measurement and imaging regions to pre-defined regions and enables the measurement or display of these regions.

12 Claims, 4 Drawing Sheets

(56) References Cited

U.S. PATENT DOCUMENTS

Figure 1:
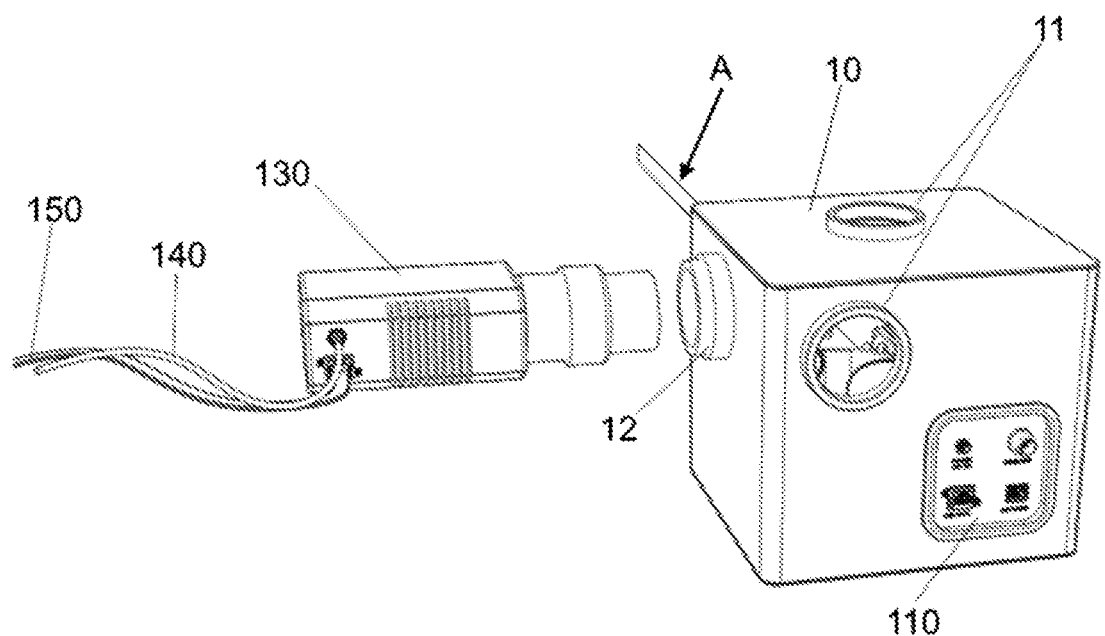

| | | | | |
|---|---|---|---|---|
| 7,221,505 B2* | 5/2007 | Goral | ............... | G02B 13/06 |
| | | | | 359/399 |
| 2004/0222366 A1* | 11/2004 | Frick | ............... | G01S 17/931 |
| | | | | 250/236 |
| 2021/0199779 A1* | 7/2021 | Gassend | ............ | G01D 5/14 |

* cited by examiner

SCANNER OPTO-MECHATRONIC SYSTEM WITH FIXED DETECTOR AND MOVING MIRROR

FIELD OF THE INVENTION

The present invention relates to a scanner opto-mechatronic system with fixed detector and moving mirror which is used in the measurement of mages and light coming from certain directions.

In particular, the present invention relates to a scanner opto-mechatronic system with fixed detector and moving mirror which performs the measurement or imaging of these regions on a single axis and with a single motor orientation by reducing the light measurement and imaging regions to predefined regions.

STATE OF THE ART

Today, when taking images from the regions determined or measuring the electromagnetic radiation coming from these regions, a lightmeter or imaging device must be directed to these areas together with an optical system.

A typical system used in the measurement of images and light from 3D space can be given as an example of the systems used in the state of the art for image and light measurement from certain directions. This typical system mainly comprises a telescope that provides orientation to the desired region so as to display a region in the sky, and a lightmeter attached to the focal plane connected to a telescope or CCD camera that acts as a displaying unit. Two motors in the telescope move the telescope in two rotation axes, and thus the telescope is directed to the desired area. At the same time, the power and signal cables connected to the camera and telescope also move with the telescope. This system allows the visualization or measurement of nearly the entire region. However, the possibility of technical failure in the system increases due to many components such as motor, motor driver, mechanical driver components, belt and similar motion transmission elements contained in said system. Furthermore, the system may be damaged due to tension, rupture or entanglement in the cables since the camera and signal cables connected to the moving axis of the telescope move with the telescope. This condition is even more important in remotely operated systems and makes it difficult to make the necessary intervention within a short period of time.

It may take time for structures with complex systems to be directed to a specific target with the abovementioned system. This reduces the time resolution of the measurement and poses an obstacle for more frequent data acquisition. Difficulties may occur in timely intervention to technical malfunctions in such systems due to transportation difficulties and lack of technical personnel.

As a result, abovementioned problems and the insufficiency of the current solutions makes it necessary to make a development in the relevant technical field.

SUMMARY OF THE INVENTION

The present invention relates to scanner opto-mechatronic system with fixed detector and moving mirror which eliminates the abovementioned disadvantages and brings new advantages to the relevant technical field.

The main aim of the invention is to ensure that images from certain special regions fall onto a fixed light measurement/imaging system by means of a series of mirrors positioned in a special position and orientation, and the mechanical structure in the specially designed form on which these mirrors are mounted with only one motor.

The aim of the invention is to prevent the damages that occur in the system due to the tension, breakage or entanglement of the cables by ensuring that the signal or power cables are fixed by means of the fixed display.

Another aim of the invention is to perform the measurement or imaging of these regions on a single axis and with a single motor orientation, without the need for complex systems, and to ensure that the image of the desired region falls on the photometer/imager device by reducing the light metering and imaging regions to predefined regions.

Another aim of the invention is to ensure that the technical problems in the system are reduced to a minimum with the help of a structure with a minimum number of parts.

Another aim of the invention is to eliminate the problems experienced in remotely managed conditions where transportation and technical intervention are difficult by minimizing the possibility of technical failure.

Another aim of the invention is to enable it to be directed to the target area in a short time and thus to obtain more frequent data with the help of its simple structure and operation with a single axis.

In order to fulfill all the purposes that may arise from the above and detailed description the present invention is a scanner opto-mechatronic system which is used in light/image measurement in three-dimensional environments, reduces the light measurement and imaging regions to pre-defined regions and enables the measurement or display of these regions, it comprises the following;

- body which has at least four displaying windows that carry the light/image coming from the predefined regions to the system and at least one light/image output window that allows the light/image coming into the scanner opto-mechatronic system to exit from the scanner opto-mechatronic system by means of the displaying window,
- at least four mirrors that are positioned in the desired position in front of the light/image output window by moving inside the body and reflects the light/image coming from the predefined regions with the displaying window from the light/image output window,
- mirror holder that connects the mirrors inside the body at an angle and brings one of the mirrors to the desired position in front of the light/image output window by making a rotational movement,
- motor that enables the mirror holder to rotate,
- motor driver electronic module that is connected to the motor and provides energy for the motor to rotate in the desired direction and speed according to the selection of the region to be measured,
- encoder disc that is connected to the shaft of the motor and determines the amount of movement of the motor,
- encoder reader that reads the encoder disc,
- control system that has control system interface panel that controls and commands the operating regime of the scanner opto-mechatronic system according to the commands given for the region to be measured and the control card that is adjacent to the control system interface panel,
- lightmeter/camera that measures and displays the light/image reflected from an appropriate mirror positioned in the light/image output window and positioned at the desired position in front of the light/image output window.

The structural and characteristic features of the present invention will be understood clearly by the following drawings and the detailed description made with reference to these drawings. Therefore the evaluation shall be made by taking these figures and the detailed description into consideration.

FIGURES CLARIFYING THE INVENTION

FIG. 1: is a general view of the scanner opto-mechantronic system

Figure 2:
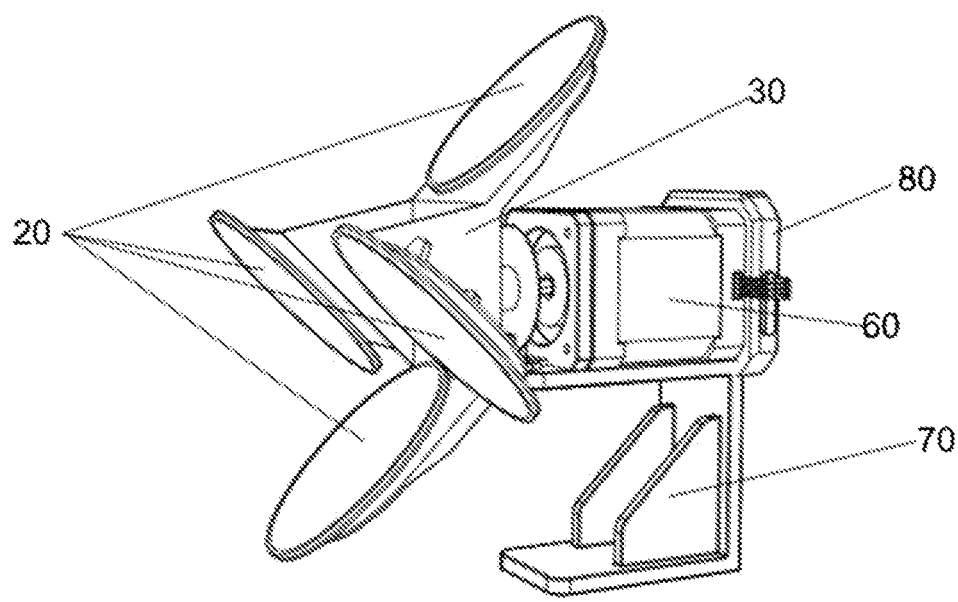

FIG. 2: is an inner detail view of the scanner opto-mechantronic system

Figure 3:
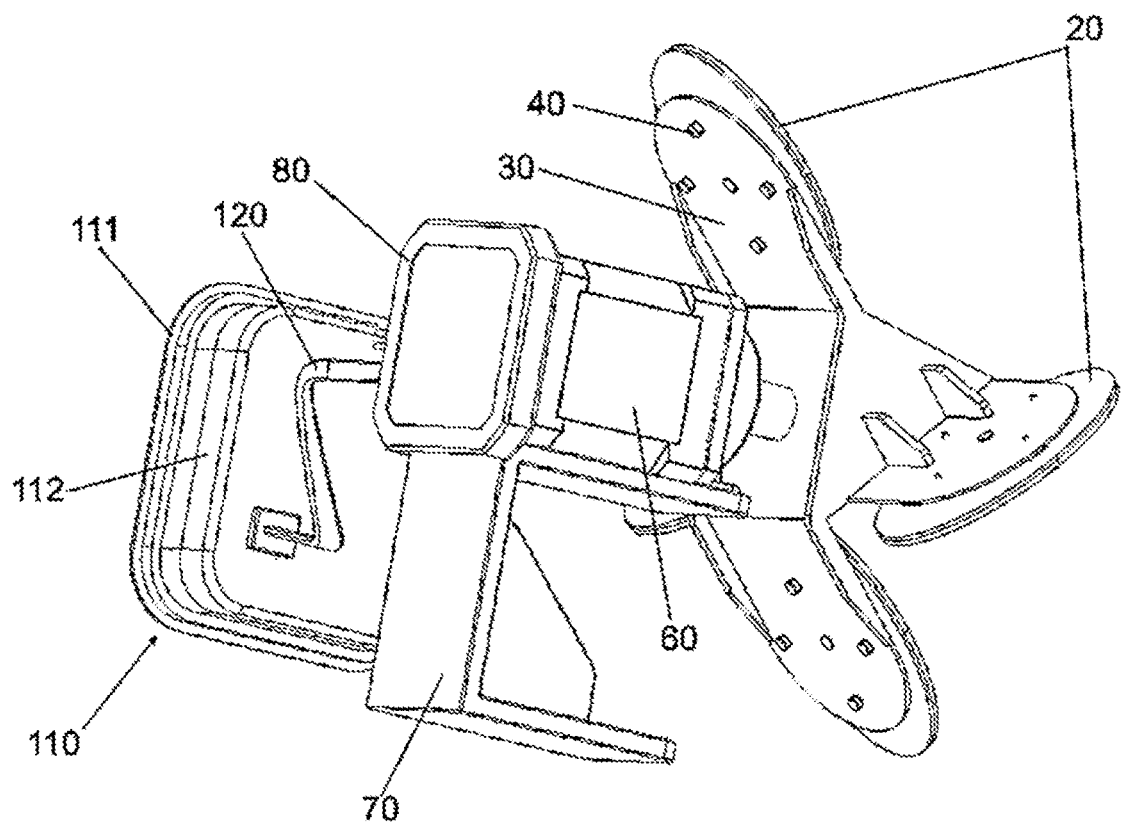

FIG. 3: is an inner detail view of the body of the scanner opto-mechantronic system from another angle.

Figure 4:
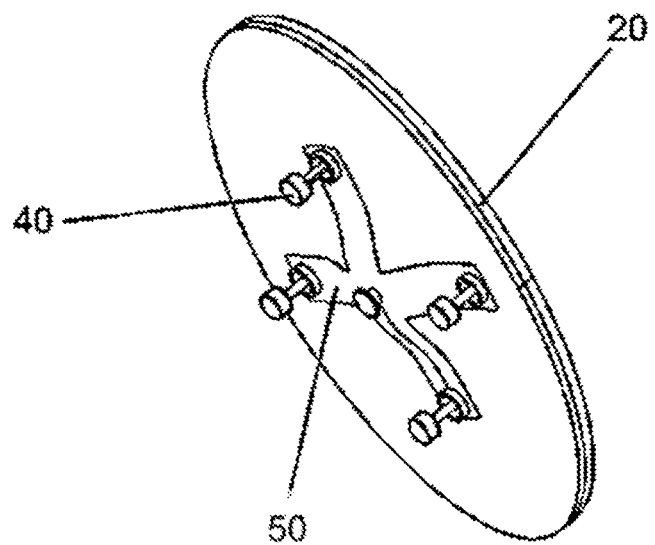

FIG. 4: is a bottom view of the mirror of the scanner opto-mechantronic system

Figure 5:
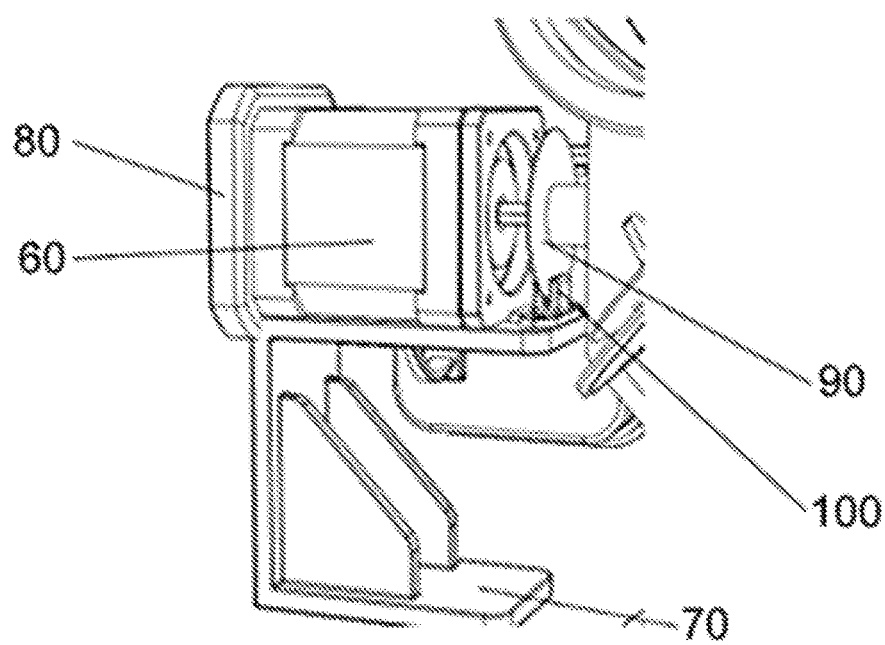

FIG. 5: is a view of the motor of the scanner opto-mechantronic system on base.

Figure 6:
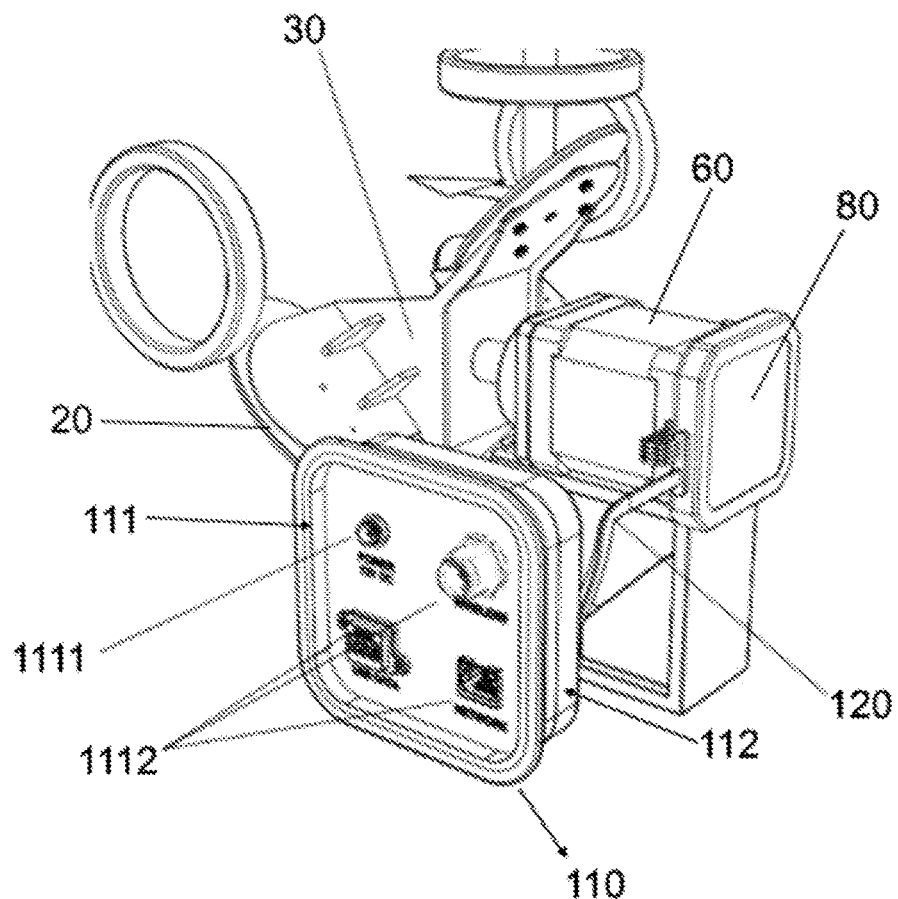

FIG. 6: is a view of the control system of the scanner opto-mechantronic system

Figure 7:
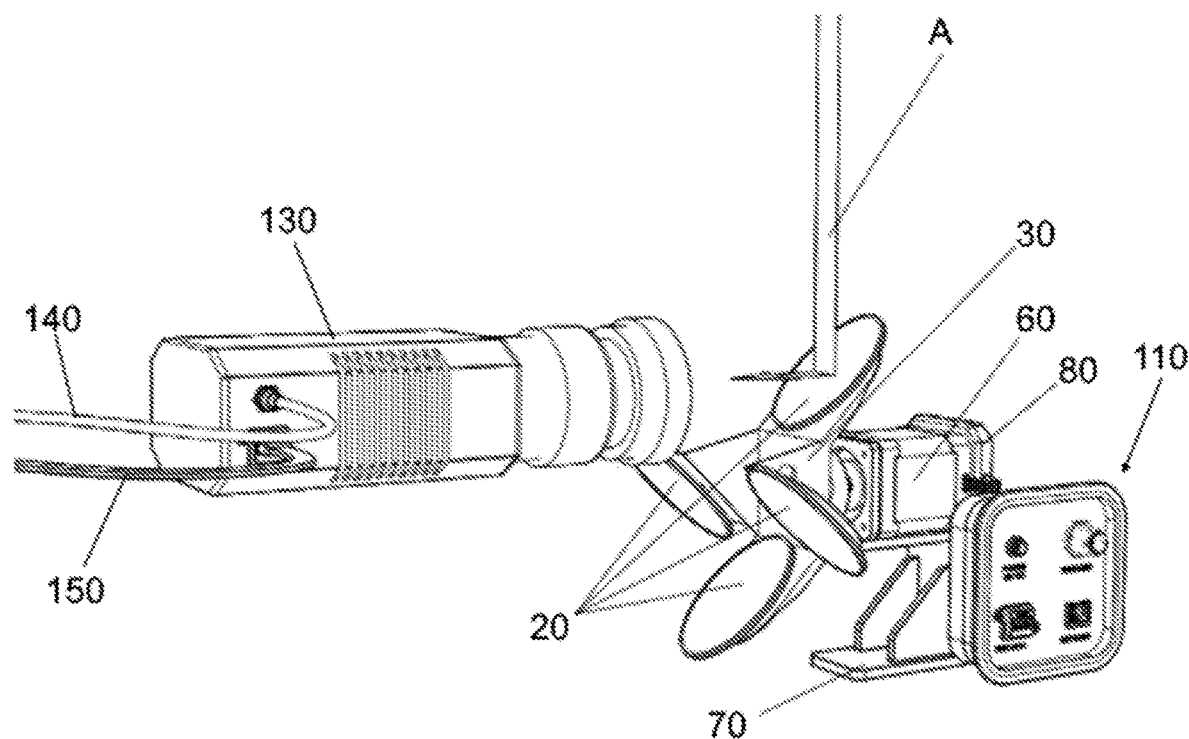

FIG. 7: is a view of the light/image projected state of the scanner opto-mechatronic system.

DESCRIPTION OF THE PART REFERENCES

10. Body
11. Displaying window
12. Light/image output window
20. Mirror
30. Mirror holder
40. Mirror adjusting screw
50. Strip spring
60. Motor
70. Foot
80. Motor driver electronic module
90. Encoder disc
100. Encoder reader
110. Control system
111. Control system interface panel
1111. Control panel feeding input
1112. Control panel data input port
112. Control card
120. Motor driver control data cable
130. Lightmeter/camera
140. Power cable
150. Data cable
A. Light/image

DETAILED DESCRIPTION OF THE INVENTION

In this detailed description, the preferred alternatives of the inventive scanner opto-mechatronic system are described only for clarifying the subject manner such that no limiting effect is created.

The general view of the inventive scanner opto-mechatronic system is given in FIG. 1. Accordingly, scanner opto-mechantronic system mainly comprises the following; body (10) which has at least four displaying windows (11) that carry the light/image (A) coming from the predefined regions to the system and at least one light/image output window (12) that allows the light/image (A) coming into the scanner opto-mechatronic system to exit from the scanner opto-mechatronic system, at least four mirrors (20) that move within the body (10) and positioned in the desired position, reflecting the light/image (A) coming from the pre-defined regions, mirror holder (30) that connects the mirrors (20) inside the body (10) at an angle and brings one of the mirrors (20) to the desired position by making a rotational movement, motor (60) that enables the mirror holder (30) to rotate, foot (70) that connects the motor (60) to the body (10), motor driver electronic module (80) that provides energy for the motor (60) to rotate in the desired direction and speed according to the selection of the region to be measured, encoder disc (90) that determines the amount of movement of the motor (60), encoder reader (100) that reads the encoder disk (90), control system (110) that controls and commands the operating regime of the scanner opto-mechatronic system according to the commands given for the region to be measured, lightmeter/camera (130) that measures and displays the light/image (A) reflected from a suitable mirror (20) positioned in front of the light/image output window (12).

The body (10) which constitutes the main structure of the inventive scanner opto-mechatronic system is in the form of a rectangle, there are at least four viewing windows (11) that carry the light/image (A) coming from the predefined regions to the scanner opto-mechatronic system and at least one light/image output window (12) that allows the light/image (A) coming from the predefined regions to the scanner opto-mechatronic system to exit from the scanner opto-mechatronic system on the body (10).

A mirror holder (30) that performs rotational movement is located inside the body (10). As seen in FIGS. 2 and 3, at least four mirrors (20) are attached to the mirror holder (30) by means of mirror adjusting screws (40) and strip springs (50). The mirror adjusting screws (40) seen in FIG. 4 pushes the mirrors (20) by pressing on the springs (50) connected to the mirror holder (30) so as to ensure precise positioning of the mirrors (20) on the mirror holder (30). In case the mirror adjusting screws (40) are loosened, the mirrors (20) move backwards together with the mirror holder screws (40) by means of the strip spring (50).

Mirror holder (30) that connects the mirrors (20) inside the body (10) at an angle makes a rotational movement within the body (10) and brings one of the mirrors (20) to the desired position in front of the light/image output window (12). Only one of the light/image (A) coming from the displaying windows (11) is reflected onto the light/image output window (12) by means of the selected appropriate mirror (20) angle. The number of mirrors (20) in the body (10) and the number of displaying windows (11) can be increased.

As seen in FIG. 5, the mirror holder (30) is moved by the motor (60) connected to the body (10) by means of a foot (70). Motor driver electronic module (80) is connected to the motor (60) and provides energy for the motor (60) to rotate in the desired direction and speed according to the selection of the region to be measured.

An encoder disc (90) is connected to the shaft of the motor (60) so as to determine the amount of movement of the motor (60). Said encoder disk (90) can be selected as magnetic, optical, capacitive, inductive and the like. Said encoder disc (90) is associated with an encoder reader (100). The rotation information of the encoder disc (90) is read by the encoder reader (100).

The operating principle of the scanner opto-mechatronic system is controlled and commanded by the control system (110) according to the commands given for the region to be measured.

Said control system (110) seen in FIG. 6 essentially comprises a control system interface panel (111) that consists of a control panel power input (1111) and a control panel data input port (1112) containing USB, wireless and Ethernet type port connections and control card (112) that is adjacent to the control system interface panel (111) for the energy supply of the scanner opto-mechatronic system.

Selection of the region to be measured, computer, microcontroller, etc. is carried out with the help of the commands sent to the control system (110) via a module with similar calculation and decision-making capabilities. The energy supply of the scanner opto-mechatronic system is provided with the supply voltage via the control panel supply input (1111). Control signals are given over the control panel data input port (1112).

Motor driver electronic module (80) is connected to the control card (112) by means of a motor driver control data cable (120). The command for the selected region to be measured is transmitted to the motor driver electronic module (80) via the motor driver control data cable (120) via the preferred control panel data input port (1112) and a suitable mirror (20) selected is positioned in front of the light/image output window (12) by the rotation of the mirror holder (30) providing the movement of the motor (60). The rotation information of the encoder disk (90) is continuously read by the encoder reader (100) so as to stop the mirror holder (30) as soon as it reaches the appropriate position. In case the information that the mirror holder (30) is in the desired position is received by the control card (112), the motor (60) is stopped by the motor driver electronic module (80).

The lightmeter/camera (130), which measures and displays the image/light (A) reflected from the selected appropriate mirror (20) coming from predefined regions (specific coordinates) in three-dimensional environments, is positioned in the light/image output window (12).

The energy supply of the lightmeter/camera (130) is provided by the power cable (140) connected to the lightmeter/camera (130).

The data communication between the lightmeter/camera (130) and the computer is provided via the data cable (150).

The operating principle of the inventive scanner opto-mechatronic system is as follows;

The energy supply of the scanner opto-mechatronic system is provided with the supply voltage via the control panel supply input (1111).

Selection of the region to be measured, computer, microcontroller, etc. is carried out with the help of the commands sent to the control system (110) via a module with similar calculation and decision-making capabilities over preferred control panel data input port (1112).

The command for the selected region to be measured is transmitted to the control card (112) via the preferred control panel data input port (1112) and to the motor driver electronic module (80) via the motor driver control data cable (120). The motor (60) is moved and the mirror holder (30) is rotated by means of the motor driver electronic module (80).

One of the mirrors (20) is brought to the desired position in front of the light/image output window (12) and at that time, the encoder disk (90) rotation information is continuously read by the encoder reader (100) and transmitted to the control card (112) so as to stop the mirror holder (30) as soon as it reaches the appropriate position. In case the information that the mirror holder (30) is in the desired position is received by the control card (112), the motor (60) is stopped by the motor driver electronic module (80).

As seen in FIG. 7, the light/image (A) coming from the displaying windows (11) is reflected to the light/image output window (12) by means of an appropriate selected mirror (20) selected which is brought to the desired position in front of the light/image output window (12) and the reflected light/image (A) is positioned in front of the light/image output window (12) and the measurement and imaging process is performed by means of a lightmeter/camera (130) powered by a power cable (140). The information generated by the measurement and imaging process with the lightmeter/camera (130) is transmitted to the external environment by means of the data cable (150).

The invention claimed is:

1. A scanner opto-mechatronic system for light or image measurement in three dimensions so as to reduce light measurement regions or imaging regions to pre-defined regions and to enable a measurement or a display of the pre-defined regions, the scanner opto-mechatronic system comprising:
   a body having at least four displaying windows that carry a light or an image from the pre-defined regions to the scanner opto-mechatronic system, said body having at least one light image output window that is configured to allow the light or the image from the scanner opto-mechatronic system to exit from the scanner opto-mechatronic system through at least one of the at least four displaying windows;
   at least four mirrors positioned in front of the at least one light image output window and movable inside said body so as to reflect the light or image from the pre-defined regions with at least one of the at least four displaying windows from the at least one light image output window;
   a mirror holder connecting said at least four mirrors at an angle relative to each other so as to rotate one of said at least four mirrors to a desired position in front of the at least one light image output window;
   a motor drivingly connected to said mirror holder so as to cause said mirror holder to rotate;
   a motor driver electronic module connected to said motor so as to energize said motor in order to rotate said mirror holder at a desired direction and speed relative to one of the pre-defined regions to be measured;
   an encoder disc connected to a shaft of said motor, said encoder disc setting an amount of movement of said motor;
   an encoder reader cooperative with said encoder disc so as to read said encoder disc;
   a control system having a control system interface panel that controls and commands an operating regime of the scanner opto-mechatronic system relative to commands for the one of the pre-defined regions to be measured, said control system having a control card adjacent to the control system interface panel; and
   a light meter or camera that measures and displays the light or the image reflected from the at least one of the at least four mirrors positioned in the at least one light image output window and positioned in front of the at least one light image output window.

2. The scanner opto-mechatronic system of claim 1, further comprising;
   a spring strip connected to said mirror holder, said spring strip adapted to precisely position the at least one of said at least four mirrors on said mirror holder; and
   a mirror adjusting screw urging against said spring strip.

3. The scanner opto-mechatronic system of claim 1, further comprising:
   a foot connecting said motor to said body.

4. The scanner opto-mechatronic system of claim 1, further comprising:
   a control panel data input port that has a port connection adapted to send commands to said control system through a module, the module adapted to compute and to make decisions for selection of the pre-defined regions.

5. The scanner opto-mechatronic system of claim 4, wherein the port connection is selected from the group consisting of a USP connection, a wireless connection and an Ethernet connection.

6. The scanner opto-mechatronic system of claim 1, wherein the control system interface panel has a control panel supply input adapted to supply energy to the scanner opto-mechatronic system.

7. The scanner opto-mechatronic system of claim 1, further comprising:
  a motor driver electronic module connected to the control card via a motor driver control data cable, said motor driver electronic module adapted to stop said motor when said mirror holder is in the desired position.

8. The scanner opto-mechatronic system of claim 1, wherein said encoder reader reads rotational information from said encoder disc so as to stop said mirror holder at a desired position, said encoder reader transmitting the desired position to the control card.

9. The scanner opto-mechatronic system of claim 1, wherein said encoder disc is magnetic.

10. The scanner opto-mechatronic system of claim 1, wherein said encoder disc is optical.

11. The scanner opto-mechatronic system of claim 1, wherein said encoder disc is capacitive.

12. The scanner opto-mechatronic system of claim 1, wherein said encoder disc is inductive.

* * * * *